W. S. WILLIAMS.
METHOD OF MAKING EARTHENWARE ARTICLES.
APPLICATION FILED JULY 28, 1919.

1,340,308. Patented May 18, 1920.

WITNESSES
J. Herbert Bradley.
Francis J. Bevilacqua.

INVENTOR
Warren S. Williams
by Christy and Christy
his attorneys

UNITED STATES PATENT OFFICE.

WARREN S. WILLIAMS, OF ROCHESTER, PENNSYLVANIA, ASSIGNOR TO H. C. FRY GLASS COMPANY, OF ROCHESTER, PENNSYLVANIA, A CORPORATION OF PENNSYLVANIA.

METHOD OF MAKING EARTHENWARE ARTICLES.

1,340,308.   Specification of Letters Patent.   Patented May 18, 1920.

Application filed July 28, 1919. Serial No. 313,822.

*To all whom it may concern:*

Be it known that I, WARREN S. WILLIAMS, residing at Rochester, in the county of Beaver and State of Pennsylvania, a citizen of the United States, have invented or discovered certain new and useful Improvements in Methods of Making Earthenware Articles, of which improvements the following is a specification.

My invention relates to improvements in method of making earthenware articles, and I have made practical application of it in the making of glass pots.

Figure 1:
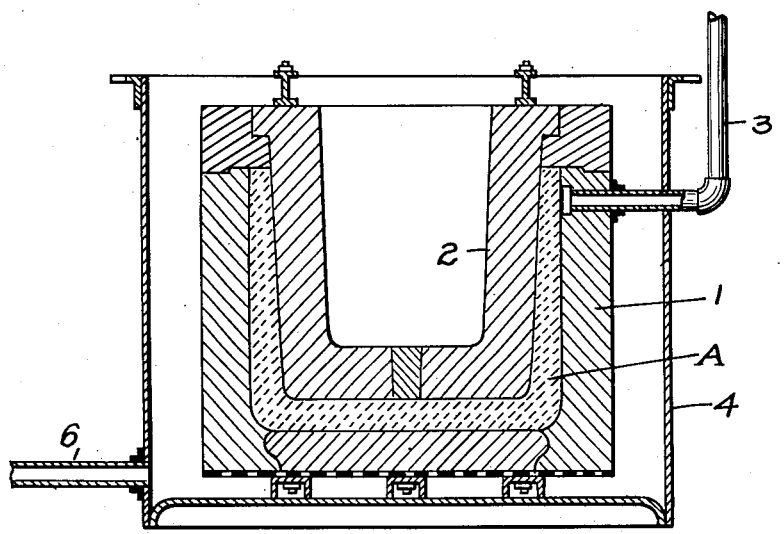
Figure 2:
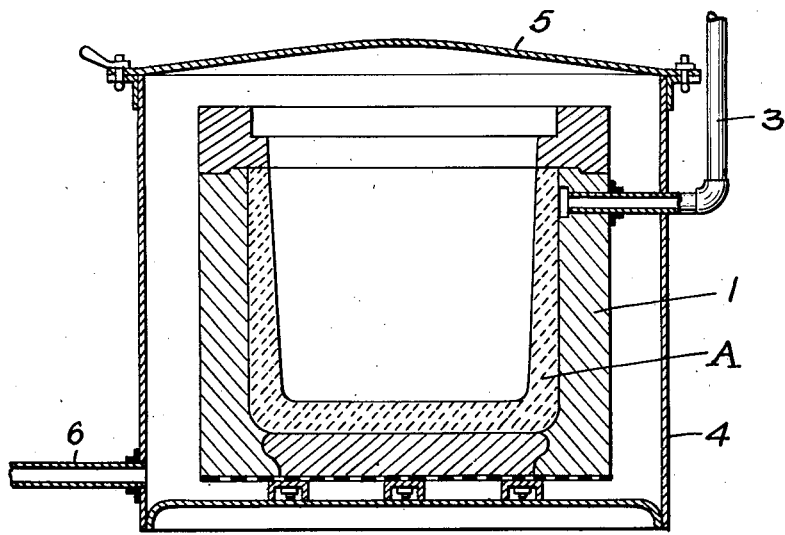

In the accompanying drawings to which I shall refer in the course of the ensuing description of my improved method, Figure 1 is a view in vertical central section of a glass pot within the mold in which it is formed, the whole being set within a pressure chamber, and Fig. 2 is a view of like character of the same assembly but with the core of the mold removed and with the cover of the pressure chamber applied.

Glass pots and other articles of earthenware are cast in plaster of Paris molds. The common procedure is to teem the earthen material (kaolin or the like) in the condition of a thick creamy "slip" into the mold cavity. The plaster of Paris mold walls absorb moisture, and the newly cast article, giving up its moisture, gains coherence. When it has thus become sufficiently hard, the mold is stripped away and drying and firing processes follow.

My invention lies in this, that, after the "slip" has been teemed, and after the newly cast article has begun to acquire coherence, but while it still is in "kneadable" condition, and while still supported by the mold, I subject the article to pneumatic compression. The pressure I preferably build up gradually, from atmospheric pressure or substantially such, to as much as 5000 pounds. After maintaining the pressure for a time, I allow it to decrease again, and, finally, when the article has gained sufficient rigidity, and pressure being again normal, I remove the article completely from the mold, and proceed with the drying and firing, in the usual, or in any preferred, manner.

It may be preferable, further, after building up pressure in the manner indicated, to alternately and repeatedly raise and lower the pressure, in order to augment the kneading effect described. For example, the pressure may initially be raised to 1000 pounds, then lowered to 500, and increased again to 1500, say, and such alteration of pressure may be repeated. There is nothing absolute about the extremes of pressure nor about the interval of variation; the range may be between 1000 pounds, or thereabout, and 500, or between 1000 and 600, or between 1200 and 700. The essential idea is elevated pressure, and, when desired, superadded to that, fluctuation of pressure.

While pressure is maintained, it may be found desirable to effect circulation of air through the pressure chamber. Such air circulation will tend to accelerate drying and hardening.

Ordinarily, it will be preferable to remove one mold part (the core member, for example) leaving the newly formed and still plastic article supported by the surrounding shell member, before building up the pressure. But this removal of a mold member is not necessary, for as the newly formed article dries it shrinks, and in so doing affords access of air between itself and the mold wall.

Referring now to the drawings, the mold as here shown consists of an outer shell 1 and a core 2; a suitable pipe 3 is provided, through which the "slip" may run into the mold cavity, to form therein the article A. This article when first cast is without coherence, but, as has already been explained, it attains coherence and rigidity gradually, as moisture is absorbed by the plaster of Paris mold walls.

When a sufficient time has elapsed after teeming in the slip, so that the article while still in "kneadable" condition is firm enough to permit of the intended operation (and of the time, experience is teacher), unfinished pot A still supported by the mold (the core member having been removed, if preferred) is brought within a pressure chamber, such as 4, a cover 5 is applied, and pressure within is built up through a pipe connection 6.

It will be understood that, as a matter of convenience, and as indicated in Fig. 1, the mold may be set within the chamber 4 at any convenient time prior to the time when in the course of operation pressure is to be applied. As shown the mold is normally in the chamber, and is so situated even before casting is performed.

Fig. 2 does not show provision for air circulation, which is permissible, and may be preferred, as explained above, while pressure is maintained; but no special illustration is here required, for such operations are generally familiar and the provision of proper details of apparatus are within engineering knowledge. Fluctuation of pressure may be resorted to if desired, without the need of further description than that given above.

When a further suitable time has elapsed (again determined by experience) during which the article A under kneading pressure has been growing compact, drying, and hardening, the pressure is relieved, and, at once or after suitable delay, the pressure chamber is opened, and the article is removed from the mold.

As has already been explained, it is not essential to the practice of the invention that one of the mold members be removed, but, as has been indicated, it will ordinarily be convenient and preferable to remove one of the mold parts before introducing the air for compression. The part removed will ordinarily be the core member, but so far as concerns the invention it is not necessary that the removed mold member be the core member, it is requisite only that the remaining mold member be adequate to support the newly cast article in the course of further treatment.

The article fabricated to the point now described is subjected to such further operations as are commonly resorted to for finishing:—drying, firing, etc. My invention is not however limited to any particular steps of further treatment, and in the ensuing claims when I define the concluding portion of the operation as "finishing" I mean to include any and all such steps of further treatment.

A glass pot (or other earthenware article) made according to my now described invention is of superior quality. I attribute its excellence to the pressing of the still kneadable material. The material has thus been subjected to a pressure with like beneficial effects, as in the kneading of hand-made pots; the particles of clay are driven together; the clay is compressed; air holes or "blebs" which otherwise might persist in the walls of the article are either eliminated or diminished in size or distributed and subdivided so as to be relatively inconsequential.

The resulting article is stronger than one not so compressed in the course of making; consequently, the walls need not be made so thick to serve particular ends. Even with the same content of material they are thinner. This means that they are less resistant to heat penetration, and in glass house operations the use of pots of my invention will effect economy of fuel; the glass will melt more quickly, and there will be economy in speed of operation.

Furthermore, the pot made according to my invention being more coherent, less friable, an undesirable characteristic of glass pots is in large measure, if not completely overcome: the characteristic that when in service small particles loosen from the inner surface of the pot and become intermingled with the glass, forming what are called "stones."

Variations in detail are of course permissible; some I have indicated, others may be hit upon. The essential features of my method are sufficiently plain.

I claim as my invention:

1. The method herein described of making a molded article which consists in teeming a grout of the material of which the article is to be formed mixed with water into a mold cavity of moisture-absorbing walls, allowing the teemed-in material to acquire coherence, exposing the newly formed article to elevated pressure, and finally subjecting the article to finishing operations.

2. The method herein described of making an earthenware article which consists in teeming a grout of clay into a mold cavity of moisture-absorbing walls, allowing the teemed-in material to acquire coherence, then kneading it pneumatically, and finally finishing it.

3. The method herein described of making an earthenware article which consists in teeming a grout of clay into a mold cavity of moisture-absorbing walls, allowing the teemed-in material to acquire coherence, then subjecting it to high and fluctuating pressure, and finally finishing it.

4. The method herein described of making an earthenware article which consists in teeming a grout of clay into a mold cavity of moisture-absorbing walls, allowing the teemed-in material to acquire coherence, exposing the newly formed article to elevated pressure, and while such elevation of pressure is maintained effecting air circulation over the surface of the article, and finally subjecting the article to a finishing operation.

5. The method herein described of making an earthenware article which consists in teeming a grout of clay into a mold of moisture-absorbing material, allowing the mold with the contained material to stand until in consequence of absorption of moisture the newly cast article has attained coherence, removing one of the mold parts and exposing the surface of the newly cast article, subjecting the newly cast article while still supported by the remaining mold part to elevated pressure, and finally finishing the article.

In testimony whereof I have hereunto set my hand.

WARREN S. WILLIAMS.

Witnesses:
G. G. TRILL,
PAUL N. CRITCHLOW.